United States Patent
Ishida et al.

(10) Patent No.: US 7,415,756 B2
(45) Date of Patent: Aug. 26, 2008

(54) MAGNETIZING METHOD USING A MAGNETIZING JIG AND METHOD OF ASSEMBLING AN ELECTRIC COMPRESSOR BY USING THE JIG AND THE MAGNETIZING METHOD

(75) Inventors: Tsuyoshi Ishida, Kanagawa (JP); Yasuhisa Takahashi, Kanagawa (JP); Hidetoshi Nishihara, Kanagawa (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 441 days.

(21) Appl. No.: 10/515,600

(22) PCT Filed: Feb. 23, 2004

(86) PCT No.: PCT/JP2004/002069

§ 371 (c)(1),
(2), (4) Date: Nov. 24, 2004

(87) PCT Pub. No.: WO2004/079883

PCT Pub. Date: Sep. 16, 2004

(65) Prior Publication Data
US 2005/0210663 A1    Sep. 29, 2005

(30) Foreign Application Priority Data
Mar. 7, 2003    (JP)    ............... 2003-062252

(51) Int. Cl.
*H01F 13/00* (2006.01)
*H02K 15/03* (2006.01)

(52) U.S. Cl. .................. 29/598; 29/596; 29/732; 310/156.53; 335/284

(58) Field of Classification Search ............ 29/596, 29/598, 732; 310/42, 44, 87, 156.53, 156.56; 335/284
See application file for complete search history.

(56) References Cited

U.S. PATENT DOCUMENTS 4,444,550 A * 4/1984 Loubier .................. 425/3
6,595,760 B2 * 7/2003 Shida et al. ............. 417/410.1

FOREIGN PATENT DOCUMENTS

| EP | 1 246 348 | 10/2002 |
| EP | 1 257 038 | 11/2002 |
| JP | 55-111645 | 8/1980 |
| JP | 58107612 A * | 6/1983 |

(Continued)

OTHER PUBLICATIONS

Machine Translation of JP2002-300762.*

*Primary Examiner*—Peter DungBa Vo
*Assistant Examiner*—Livius R Cazan
(74) *Attorney, Agent, or Firm*—Wenderoth, Lind & Ponack, L.L.P.

(57) ABSTRACT

In a method for assembling an electric compressor which contains a rotor having built-in magnets, magnets in a premagnetization state are inserted into a plurality of slots of a magnetizing jib made with a nonmagnetic material. After magnetizing the magnets, the magnetizing jib is fitted to the rotor to have the magnets transferred into magnet slots. A magnetizing method and an assembly method for implementing high reliability electric compressors at low manufacturing cost is implemented.

10 Claims, 12 Drawing Sheets

FOREIGN PATENT DOCUMENTS

| | | |
|---|---|---|
| JP | 63-73861 | 4/1988 |
| JP | 63073861 A * | 4/1988 |
| JP | 05 168201 | 7/1993 |
| JP | 5-168201 | 7/1993 |
| JP | 11-252874 | 9/1999 |
| JP | 11-275824 | 10/1999 |
| JP | 11 341753 | 12/1999 |
| JP | 2000-116080 | 4/2000 |
| JP | 2000-224818 | 8/2000 |
| JP | 2002-199670 | 7/2002 |
| JP | 2002-300762 | 10/2002 |
| JP | 2002300762 A * | 10/2002 |
| JP | 2004 293492 | 10/2004 |
| WO | WO 0279530 A2 * | 10/2002 |

* cited by examiner

Reference marks in the drawings

| | |
|---|---|
| 100 | Magnetizing jig |
| 104 | Slot (in the jig) |
| 110, 310 | Rotor |
| 114 | End-ring |
| 115 | Secondary conductor |
| 116 | Opening (for the shaft) |
| 118, 318 | Magnet slot |
| 130, 330 | Magnet |
| 142 | Search coil |
| 200 | Sealed vessel |
| 203, 303 | Stator |
| 205, 305 | Motor |
| 210 | Compressing element |
| 212 | Shaft |
| 214 | Compression chamber |
| 216 | Cylinder |

MAGNETIZING METHOD USING A MAGNETIZING JIG AND METHOD OF ASSEMBLING AN ELECTRIC COMPRESSOR BY USING THE JIG AND THE MAGNETIZING METHOD

This application is a U.S. national phase application of PCT International Application PCT/JP2004/002069.

TECHNICAL FIELD

The present invention relates to a magnetizing jig for magnetizing magnets to be inserted in a rotor of electric compressor and a magnetizing method using the jig. The present invention relates also to methods for assembling rotors and electric compressors using the magnetizing jig and the magnetizing method.

BACKGROUND ART

In the growing concern with environmental conservation, the energy-saving activities are being accelerated also in the industrial fields of home-use refrigerators and air conditioners. In the sector of electric compressors for compressing the refrigerant gas, an increasing number of motors employ such a rotor provided with magnets built therein. A conventional method of magnetizing the magnets is disclosed in Japanese Patent Laid-Open Application No. 2002-300762. According to the method disclosed in the patent, the magnets built within a rotor are magnetized by an electric current delivered to the stator's coil.

Figure 11:
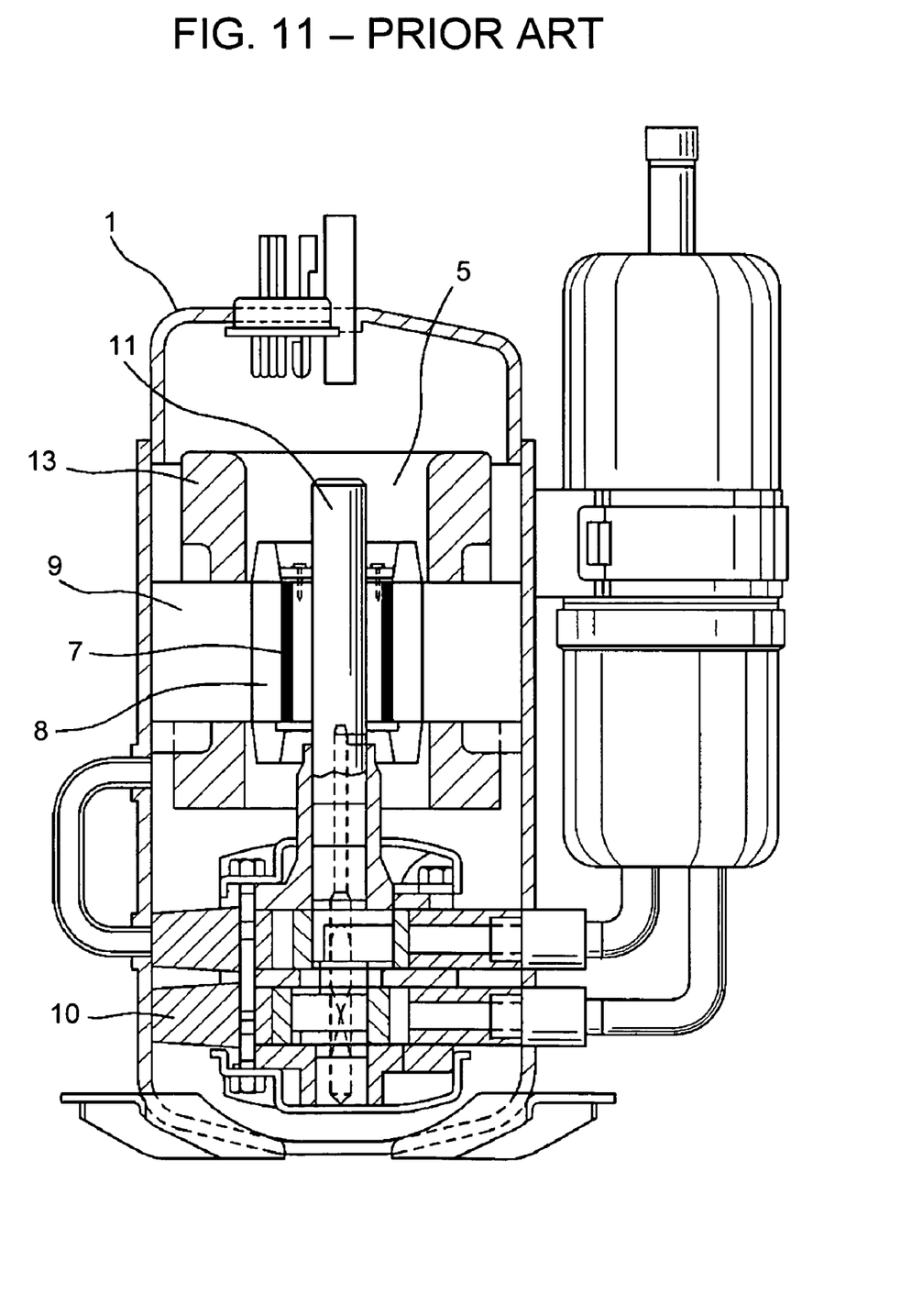
FIG. 11 shows a vertical cross sectional view of a conventional compressor.
Figure 12:
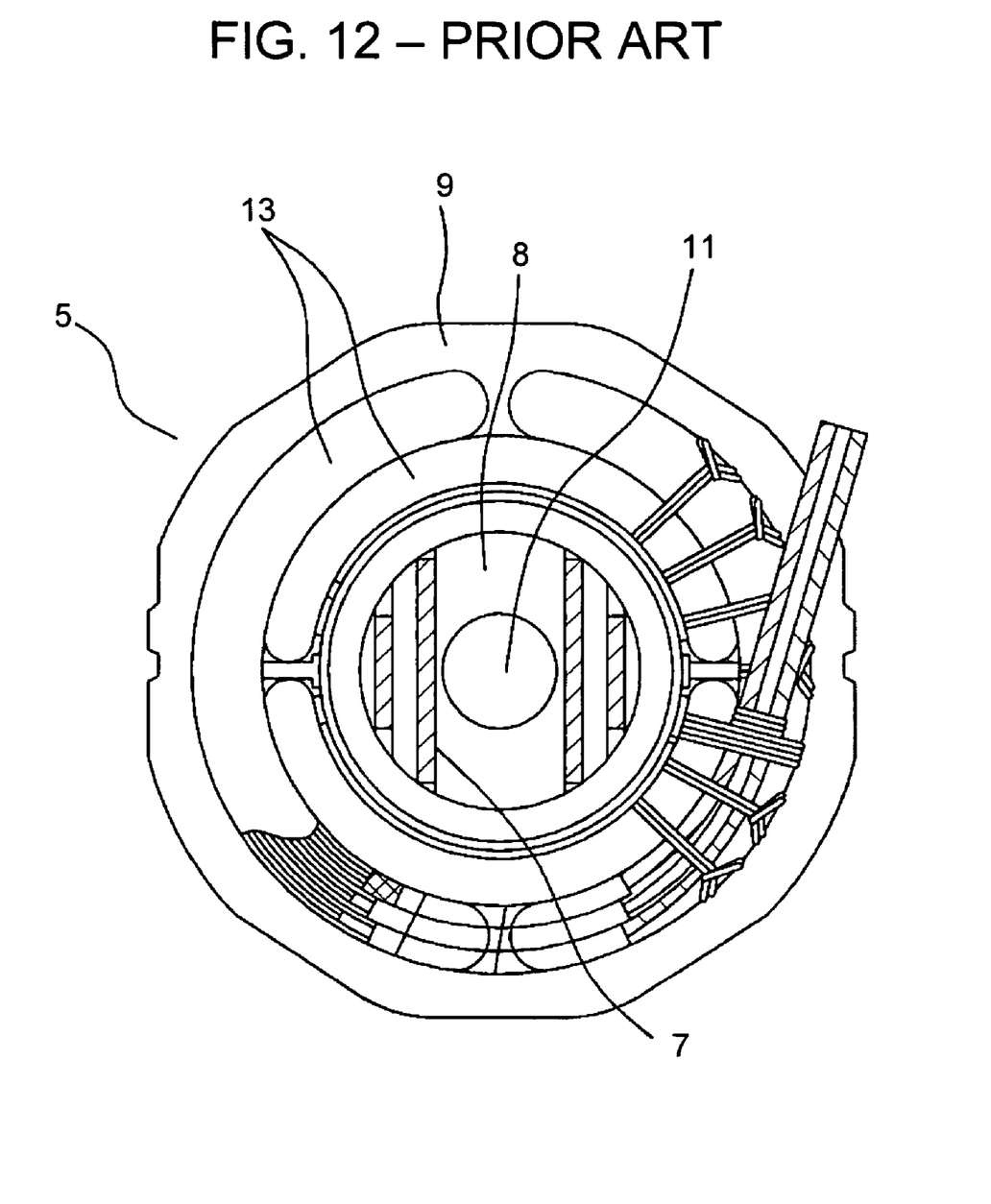
FIG. 12 shows a cross sectional view, as viewed from the above, of a conventional compressor, with the sealed vessel cut into two pieces.

In the following, the above conventional magnetizing method is described referring to FIG. 11 and FIG. 12. FIG. 11 shows a sealed vessel of conventional electric compressor (hereinafter referred to as compressor), sectioned vertically. FIG. 12 shows the conventional compressor, as viewed from the above, whose sealed vessel has been cut into two pieces. Sealed vessel 1 houses motor 5 and rolling-piston type compressing element 10 driven by motor 5. Motor 5 includes rotor 8 having built-in magnets 7 at a pre-magnetization state and stator 9 which is fixed to inner surface of the sealed vessel. Compressing element 10's shaft 11 is coupled and fixed with rotor 8. Coil 13 of stator 9 is reinforced and fixed with an immersing varnish.

A method of magnetization in the above-configured compressor is described below.

Shaft 11 is fixed fastened at a certain specific position with no rotary motion allowed, and then a certain specific electric current is delivered to coil 13 of the stator. Magnets 7 at the pre-magnetization state are magnetized by the magnetic fields thus generated. This has been one of the generally-used methods for magnetizing the magnets built in a rotor.

However, in a case where a neodymium magnet or the like rare earth magnet is used for the magnet, it requires such magnetic fields several times as strong as compared with conventional examples where a ferrite magnet is used for the magnets.

Strength of magnetic fields is in proportion to the strength of electric current. So, it requires a big electric current to generate strong magnetic fields.

For generating a big current used for the magnetization, the electric energy is once stored in a capacitor, and then discharged instantaneously. At this moment of electric discharge, the coil wound around a stator is heated by the big current and at the same time ill-affected by the strong magnetic fields. As the result, the coil is liable to be deformed, or seriously damaged.

In the case of synchronous motors, among other motor types, where the rotor is provided with a secondary conductor disposed at the circumference of rotor's iron core portion, the magnetizing effects are retarded by the secondary conductor. As the result, it requires an electric energy of higher strength for the magnetization. This means that the conventional magnetizing method which makes use of an electric current delivered to a coil causes a substantial damage on the coil. Eventually, it will make it very difficult to use the magnetizing method in normal production. In order to prevent the damage the stator's coil in a varnish, in order to have the coil physically reinforced and fixed. However, immersing a coil in a varnish accompanies a substantial increase in the number of process steps, resulting in an increased cost. Meanwhile, a magnetized magnet can be inserted in a rotor if its magnetic force is moderate; but it may not be easy to insert a neodymium or the like rare-earth magnets, which have far stronger magnetic force, after they are magnetized. Such magnets readily stick onto the rotor's core iron and significantly deteriorate the efficiency of operation.

The present invention addresses the above problems, and aims to offer reliable compressors at lower cost. A magnetizing jig and a method for magnetization serving the above objective are also disclosed.

DISCLOSURE OF THE INVENTION

The present invention offers a magnetizing jig made of a nonmagnetic material provided with a plurality of slots for retaining magnet.

Also offered by the present invention is a method for assembling a rotor, which method including a step of inserting the magnet at pre-magnetization stage into the magnetizing jig which is made of a nonmagnetic material and provided with a plurality of slots, a step of magnetizing the magnet by delivering electricity to a coil disposed around the outer circumference of the magnetizing jig, a step of fitting the magnetizing jig to the rotor at an end-face, and a step of pushing a magnetized magnet out of the jig's slot and inserting it into a magnet slot.

DETAILED DESCRIPTION OF THE PREFERRED EMBODIMENTS

Preferred embodiments of the present invention are described in the following referring to the drawings.

The preferred sorts of magnet for use as the magnet of the present invention are those having a large energy product. Specific preference is for the rare-earth magnet, such as a samarium-cobalt system magnet or a neodymium system magnet. In the exemplary embodiments of the present invention, a neodymium system magnet is used.

The iron core portion is formed by stacking a soft magnetic material. In the present embodiments, a silicon steel sheet is used as an example of the soft magnetic material.

The drawings have been provided to illustrate concept of the invention, they are not intended to give precise dimensions or locations.

First Exemplary Embodiment

As shown in FIG. 1 through FIG. 4, magnetizing jig 100 has an approximate cylindrical shape, which is made of a stainless steel, or a nonmagnetic material.

Figure 1:
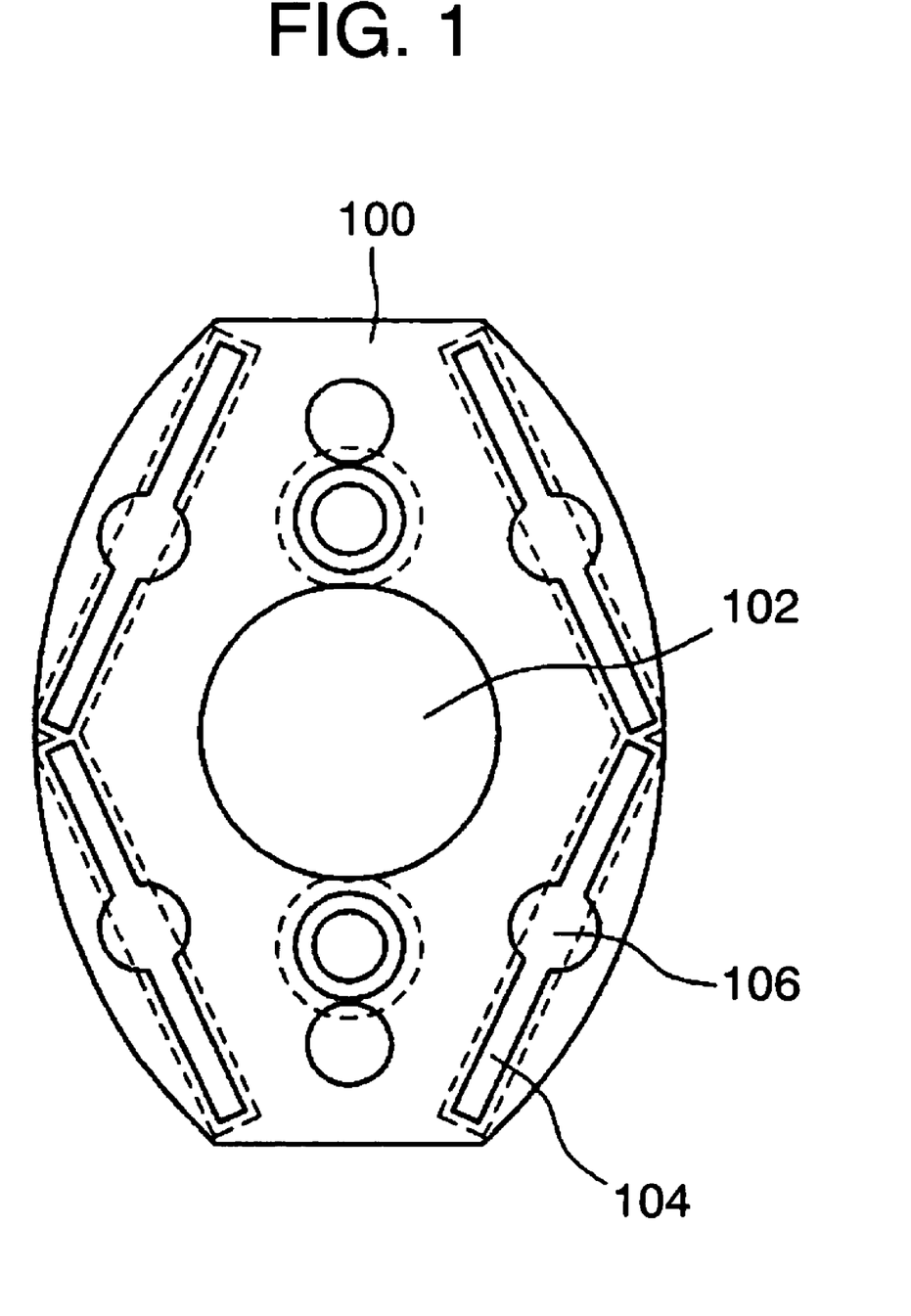
FIG. 1 shows a plan view, as seen from the above, of a magnetizing jig in accordance with a first exemplary embodiment of the present invention.
Figure 2:
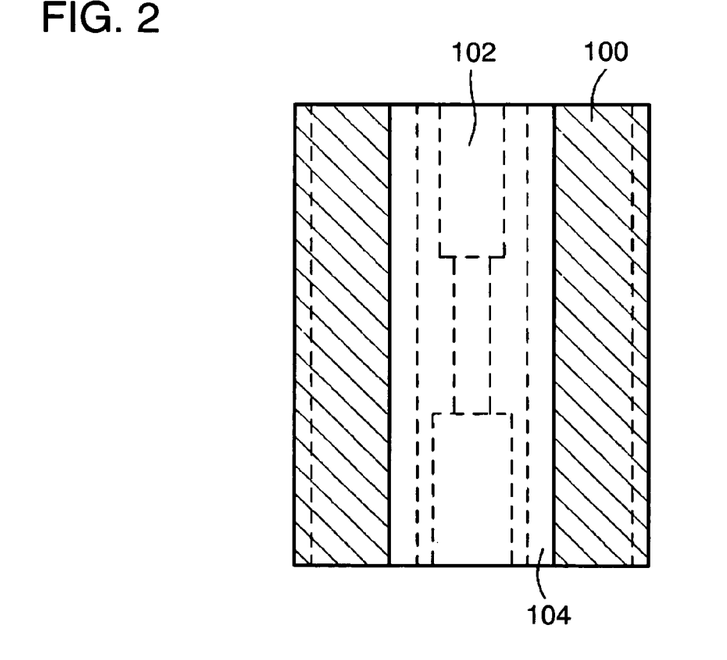
FIG. 2 is a vertical cross sectional view of the magnetization jig.

Magnetizing jig 100 is provided at the centre with through hole 102 for coupling with a shaft, and slot 104 to be used for receiving a magnet along axis direction of the through hole. There are four slots 104 around through hole 102.

Respective slots 104 have, at their middle part, hole 106 whose diameter is greater than width of the slot. Hole 106 is provided for allowing a push-out pin to go through.

Figure 3:
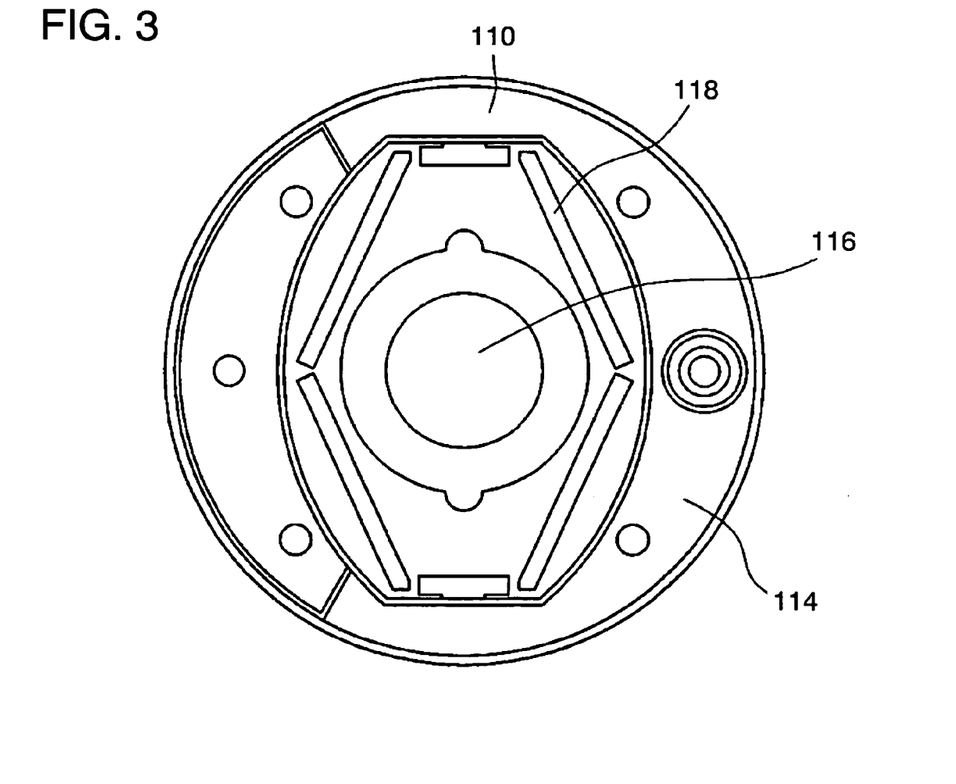
FIG. 3 shows a plan view, as seen from the above, of a rotor in accordance with a first exemplary embodiment of the present invention.
Figure 4:
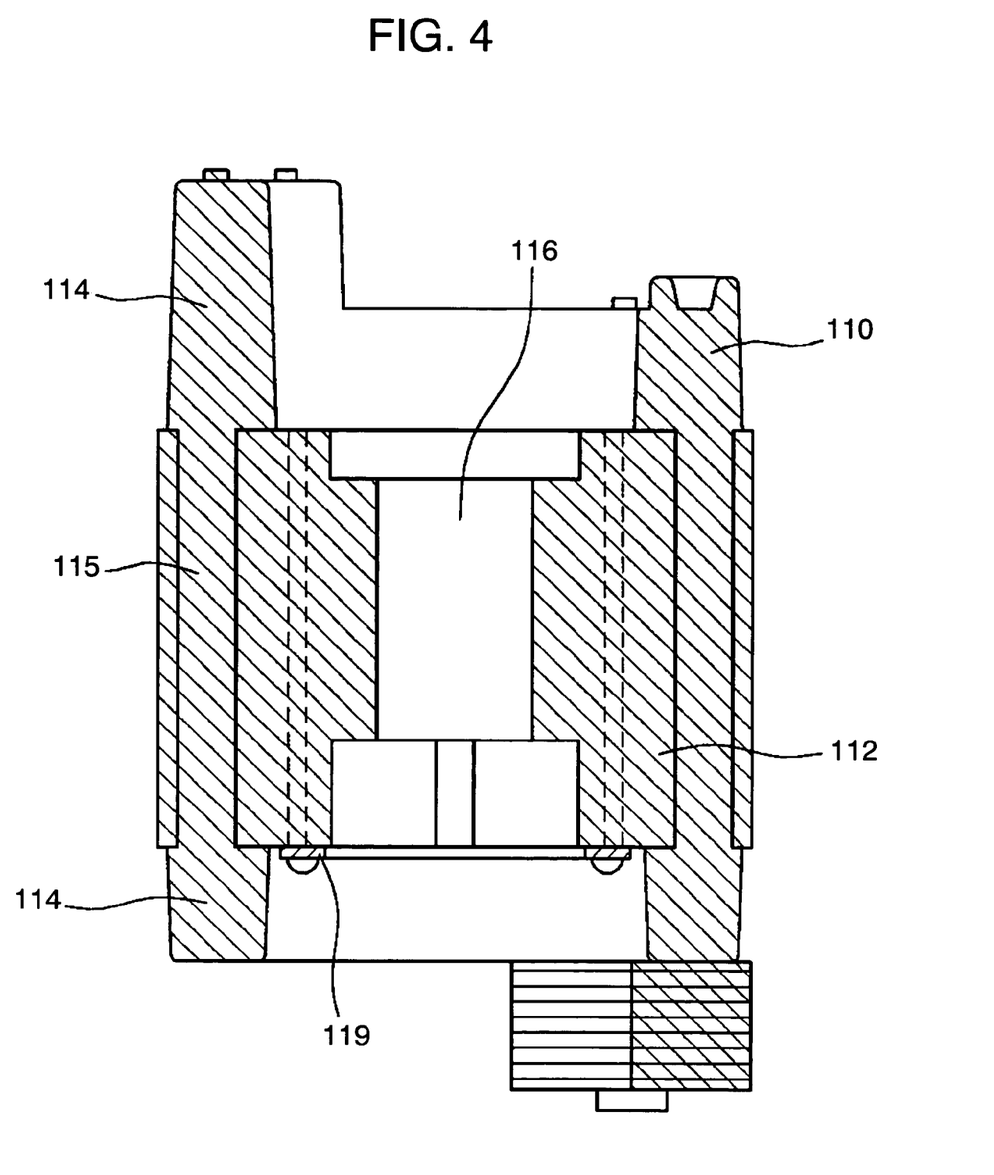
FIG. 4 is a vertical cross sectional view of the rotor.

Rotor 110 of a dipole magnet type motor includes iron core portion 112 formed by stacking silicon steel sheets and die-cast aluminum end-ring 114 disposed at both end-faces of iron core portion 112.

At the vicinity of outer circumference of iron core portion 112, a plurality of die-cast aluminum secondary conductors 115 is provided connecting end-rings 114 through. Iron core portion 112 is provided at the center with opening 116 for press fitting with a shaft, and magnet slots 118 for holding the magnet around opening 116. End-ring 114 is formed, at the inner circumference, in an oval shape with both of its end regions cut off. Provided fixed at the bottom end-face of iron core portion 112 is end-plate 119 for sealing the open bottom-end of magnet slot 118.

The outside shape of magnetizing jig 100 is regulated by rotor 110's end-ring 114 which has an approximate oval shape with its both end regions cut off. Magnetizing jig 100 is designed so that it fits to the upper end-face of rotor 110.

Magnetizing jig 100's four slots 104 are located so that they coincide with rotor 110's magnet slots 118, when magnetizing jig 100 is fitted to rotor 110.

The above-configured magnetizing jig 100 loaded with magnetized magnets inserted in the respective slots is fitted onto the upper end-face of rotor 110. The magnets are pushed out of magnetizing jig 100 to be inserted in magnet slot 118 of rotor 110. The magnets are thus transferred into magnet slots 118.

Since magnetizing jig 100 is made of a stainless steel, or a nonmagnetic material, the magnets do not stick to magnetizing jig 100. Therefore, the magnets can be pushed out of magnetizing jig 100 and inserted into rotor 110's magnet slots 118 easily, encountering only a very small resisting force. In other words, the magnet transferring operation is carried out smoothly; there is least possibility of causing damage to the magnets. This is the point of significant importance when handling a magnet of great magnetic force, such as a neodymium magnet.

The magnets stay within magnetizing jig 100 taking advantage of mutual magnetic force. Therefore, the magnets do not fall down even if slot 104 is positioned in parallel with the direction of gravitation. Thus, the magnetizing jig can be handled with ease. The magnets held within magnetizing jig 100 are pushed out by a push-out pin inserted in the hole of respective slots 104. In this way, respective magnets are transferred simultaneously with high reliability into magnet slot 118 to be retained therein at their specified locations.

As described in the above, the present embodiment implements a magnetizing jig that can be handled with significant ease and high efficiency for the assembly of compressors.

Although magnetizing jig 100 in the present embodiment has been formed of a stainless steel, other nonmagnetic materials such as a nonferrous system metal, a resin material may of course be used for the magnetizing jig.

Other preferred materials include a nonferrous metal such as an aluminum alloy provided with an improved surface hardness by the Alumite coating, a resin material provided with self-lubricating property such as ethylene tetrafluoride, etc.

Second Exemplary Embodiment

The present embodiment describes a method for assembling rotor and compressor.

In the first place, a step of inserting magnets into a magnetizing jig is described.

Figure 5:
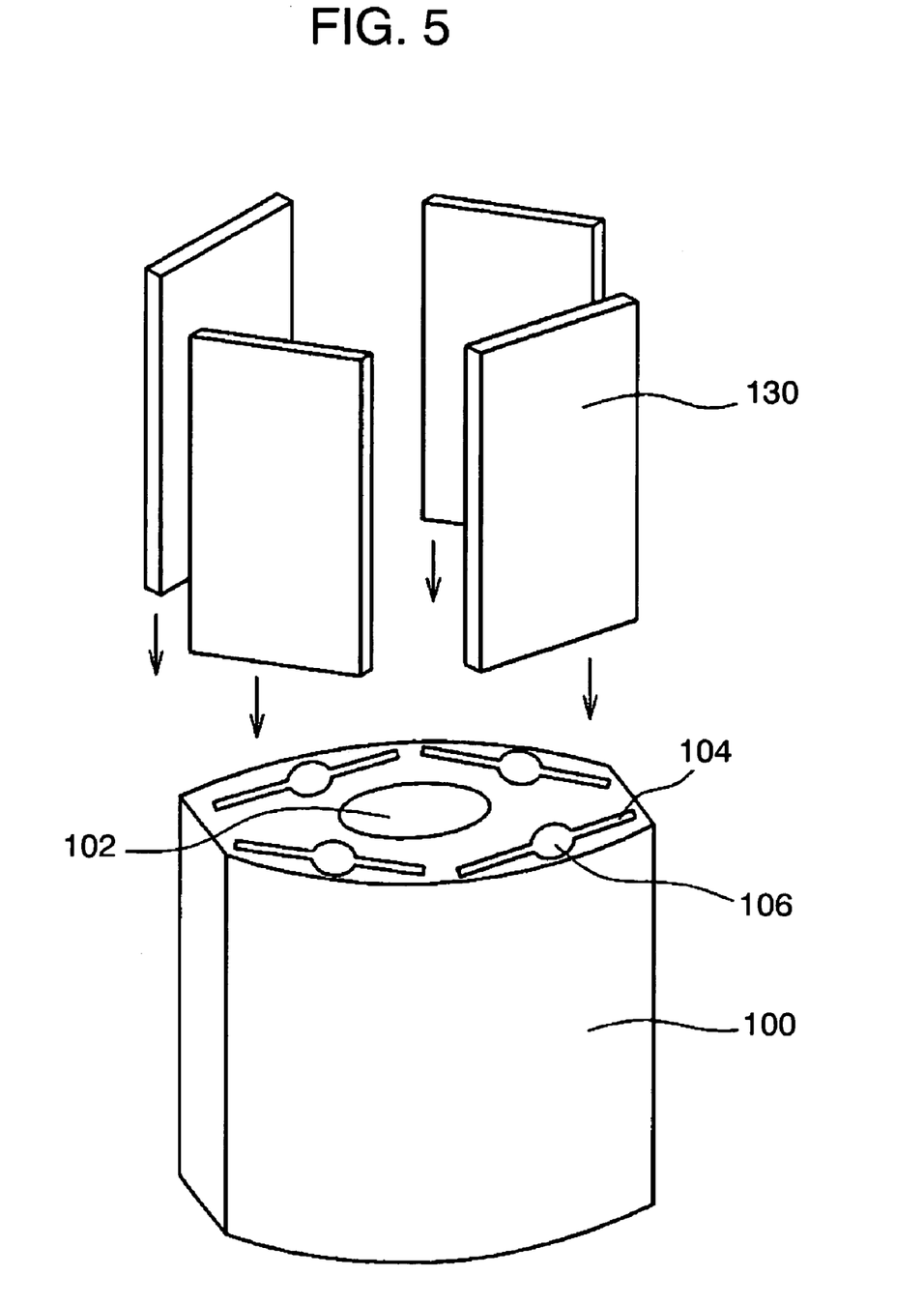
FIG. 5 is a perspective view used to show a process how magnets are inserted in accordance with a second exemplary embodiment of the present invention.

Reference is made to FIG. 5, magnet 130 at pre-magnetization state (i.e., pre-magnetizing magnets) are inserted into the four slots 104 magnetizing jig 100. After being loaded with magnets 130, magnetizing jig 100 is held approximately perpendicular to the direction of gravity so that magnets 130 do not fall down out of slot 104 due to their own weight. Since magnets 130 at this stage are not yet magnetized, there is no magnetic force working among them. So, the magnets can be inserted easily into slots 104. The step of insertion is thus easily completed. Next, a step of magnetizing the magnets is described.

Figure 6:
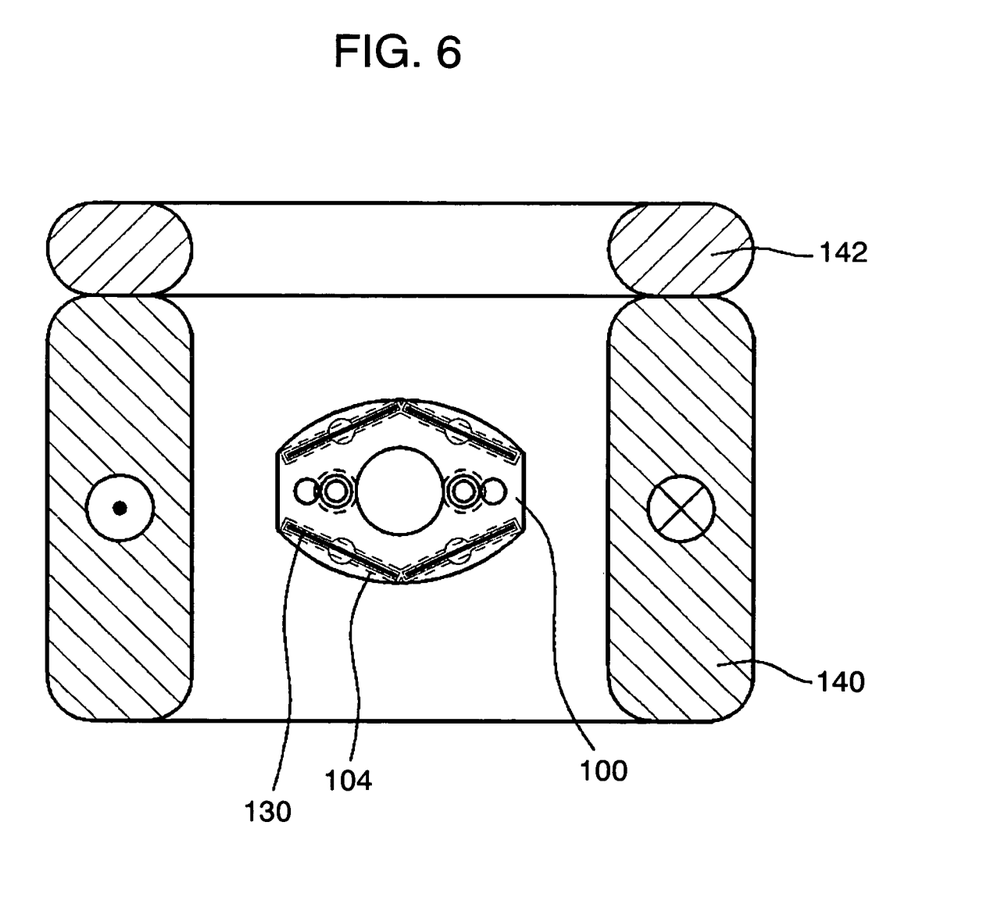
FIG. 6 is a cross sectional view used to show the magnetization process and measurement process in the second embodiment.

Magnetizing coil 140 wound in an approximate cylindrical shape, as shown in FIG. 6, is connected with a power supply source (not shown) capable of delivering a large electric current. The magnetizing coil is accompanied by search coil 142 wound in an approximate cylindrical shape.

Magnetizing coil 140 and search coil 142 are both immersed in a varnish and fixed.

The magnetizing jig loaded with the pre-magnetization magnets is carried to the inside of magnetizing coil 140, with slot 104 kept substantially perpendicular to the gravitation line. The magnetizing jig is held and carried by a dedicated jig (not shown) to a certain specific place inside magnetizing coil 140.

Then, the above-described power supply source (not shown) delivers a certain specific electric current to magnetizing coil 140 in order to magnetize magnets 130. This completes the step of magnetization.

The above-described certain specific electric current means a sufficient electric current that is enough to generate magnetic fields needed for magnetizing the magnets to a certain predetermined level. Search coil 142 measures the magnetic flux of magnets 130; so, a possible error in the magnetization can be prevented.

The step of magnetizing the magnets by supplying electricity to the coil wound around the magnetizing jig and the step of measuring the magnetic flux of magnetized magnets are now completed.

Figure 7:
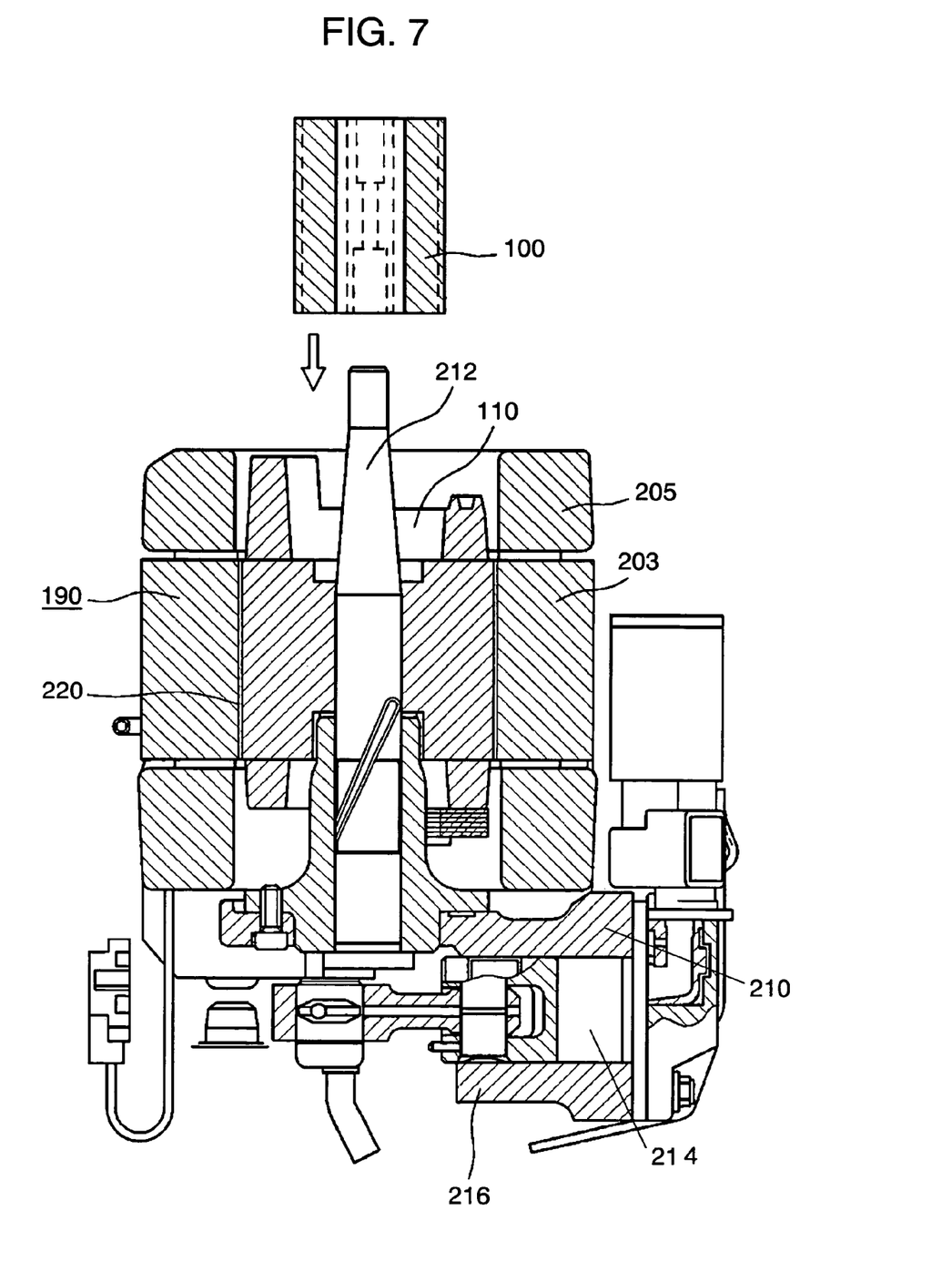
FIG. 7 is a cross sectional view used to show a step of fitting the magnetizing jig in accordance with the second embodiment of the present invention.

Next, a step of fitting the magnetizing jig onto a rotor at the end-face is described. As shown in FIG. 7, compressor's mechanical section 190 includes motor 205 formed of stator 203 and rotor 110, and compressing element 210 which is driven by motor 205. Mechanical section 190 contains revolving shaft 212, and cylinder 216 which supports shaft 212 and forms compression chamber 214. After shaft 212 and rotor 110 are coupled and fixed together, a spacer of certain specific thickness is placed between rotor 110 and stator 203 and then stator 203 is fixed to cylinder 216. The spacer is removed afterwards. In this way, certain specific gap 220 is provided between stator 203 and rotor 110. Normally, the certain specific gap is 1 mm or less, a preferred gap is approximately 0.5 mm.

Since rotor 110 is not yet loaded with magnets 130 at this stage, there can be no possibility of dislocation due to magnetic forces of the magnets. Therefore, the dimensional accuracy with gap 220 between stator 203 and rotor 110 can be ensured to be substantially homogeneous over the entire circumference.

On mechanical section 190 thus assembled, magnetizing jig 100 keeping magnetized magnets 130 within is fitted to the upper end-face of rotor 110.

The step of fitting the magnetizing jig on the rotor is thus completed.

Figure 8:
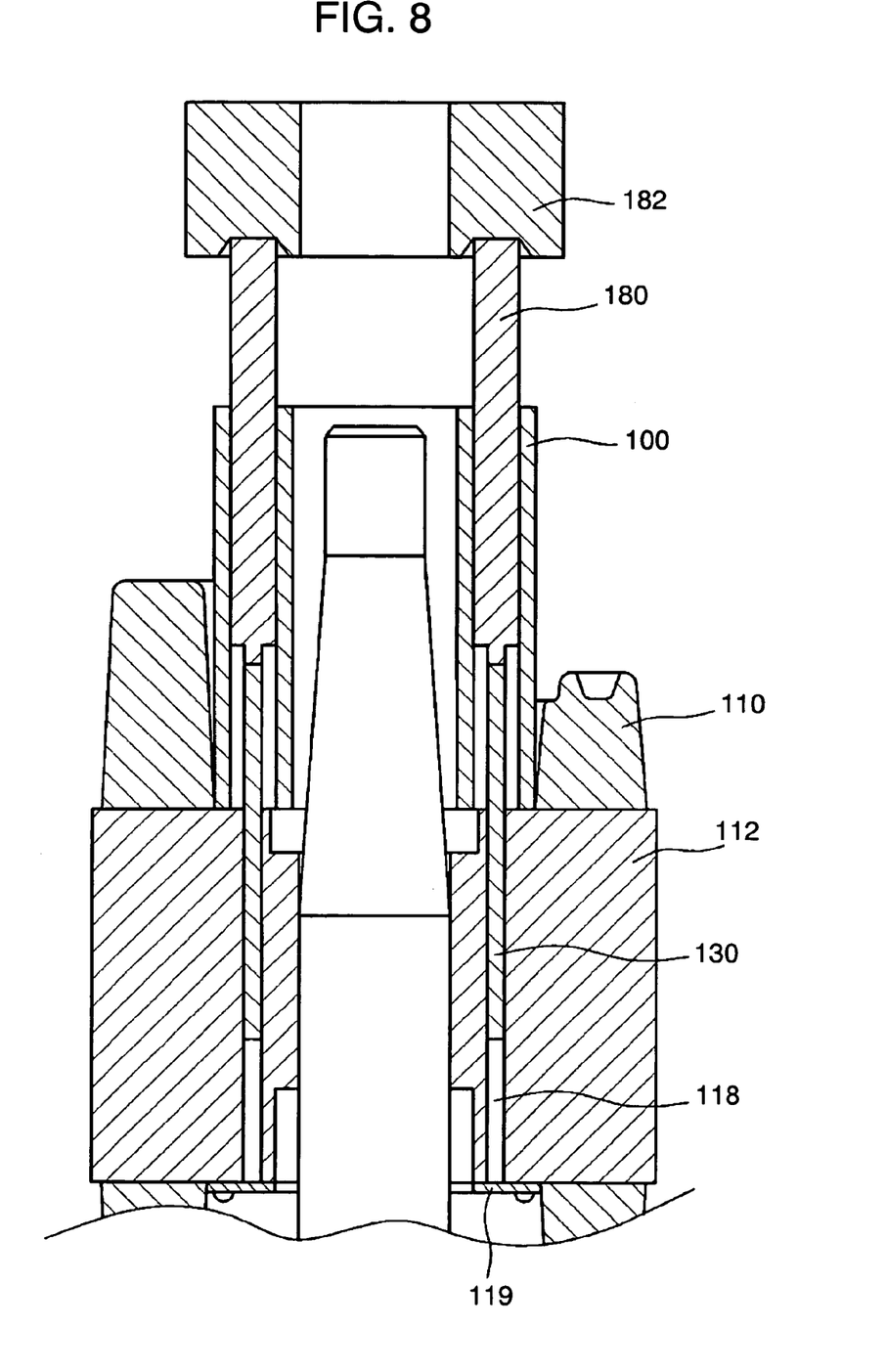
FIG. 8 is a cross sectional view used to show a step of transferring/inserting the magnet in the second embodiment.

Finally, a step of transferring the magnets into the rotor's magnet slots 118 is described. As shown in FIG. 8, rotor 110 had magnetizing jig 100 have been fitted together. Rod-shaped push-out pins 180 disposed at hole 106 are pressed downward by push member 182. Magnets 130 are pushed to be inserted into magnet slots 118 of iron core portion 112. Magnets 130 proceed until they have mechanical contact with end-plate 119, and stop there. Thereby, magnets 130 are placed at certain specific locations. This completes the step of pushing magnetized magnets 130 out of the jig's slots 104 and inserting them into magnet slots 118.

As described in the above, magnetized magnets can be transferred easily and smoothly into a rotor in accordance with the present embodiment. Thus the operation efficiency is high. Furthermore, there is no need of immersing the stator coil in a varnish, because the coil is not requested to withstand a big over current. In this way, the present embodiment offers a method for assembling reliable compressors at low cost.

Third Exemplary Embodiment

Figure 9:
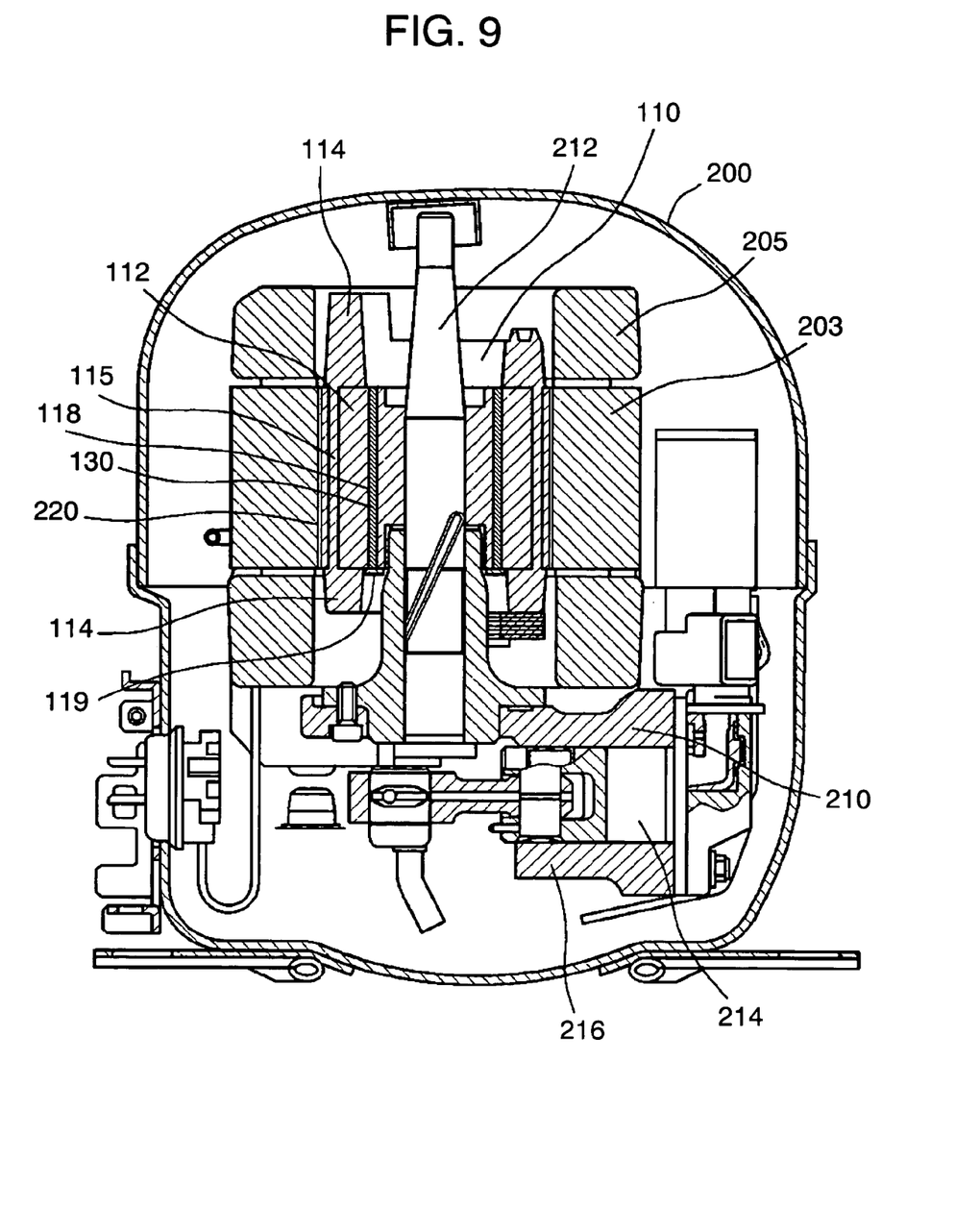
FIG. 9 is a vertical cross sectional view showing a compressor in accordance with a third exemplary embodiment of the present invention.

Reference is made to FIG. 9, sealed vessel 200 houses motor 205 having stator 203 and rotor 110, and compressing element 210 driven by motor 205.

Compressing element 210 includes revolving shaft 212, and cylinder 216 which supports shaft 212 and forms compression chamber 214. Shaft 212 and rotor 110 are coupled and fixed together, and stator 203 is fixed on cylinder 216 so that it is coaxial to shaft 212 and there is certain specific gap 220 to rotor 110 and stator 203.

Rotor 110 includes iron core portion 112 and die-cast aluminum end-ring 114 provided at both end-faces of iron core portion 112. At the vicinity of outer circumference of iron core portion 112, a plurality of secondary conductors 115 made of die-cast aluminum is provided connecting end-rings 114 through. Magnet slot 118 for storing magnet has been loaded with magnet 130. These constitute a dipole magnet type motor. Provided fixed at the bottom end-face of iron core portion 112 is end-plate 119 for sealing the open bottom-end of magnet slot 118. The top-end of magnet slot 118 are left open, with no end-plate attached. Method of assembling the compressor remains the same as that in the second embodiment.

Now the operation of the above configuration is described.

When electric power is delivered from a home power source to stator 203, rotor 110 revolves in engagement with shaft 212. Compressing element 210 compresses the gas sucked in compression chamber 214.

The compressor has been assembled in accordance with the same method as described in the second embodiment. The assembly operation is easy and the efficiency is high, and there is no need of delivering an over-current to the stator. Therefore, the compressors thus assembled exhibit a high reliability.

Furthermore, there is no need of immersing the stator coil in a varnish. This contributes to a reduction in the manufacturing cost.

Still further, since magnet 130 kept at a certain specific place in magnet slot 118 is magnetically sticking (adhering) to silicon steel sheets, forming the iron core portion the magnet can hardly be displaced away from the certain specific places unless they are affected by an extraordinary force. Therefore, there is no need seal the open ends of magnet slot 118; at least a sealing process at the at the insertion ends (open ends at the top end-face) can be eliminated.

Further, end-plate 119 in the present embodiment can also be eliminated, because magnet 130 is pushed downward, via push member 182, with rod-shaped push-out pin 180 disposed at hole 106 for a certain specific distance to be inserted into magnet slot 118 of iron core portion 112 until it reaches at a certain specific place. This contributes to implement an inexpensive compressor which is consisting of a reduced number of constituent components.

As described in the above, a reliable compressor consisting of smaller component counts can be offered at a low cost in accordance with the present embodiment.

Fourth Exemplary Embodiment

Those constituent portions in the present embodiment identical to those of the third embodiment are represented by using the same symbols, and further detailed description thereof is omitted.

Figure 10:
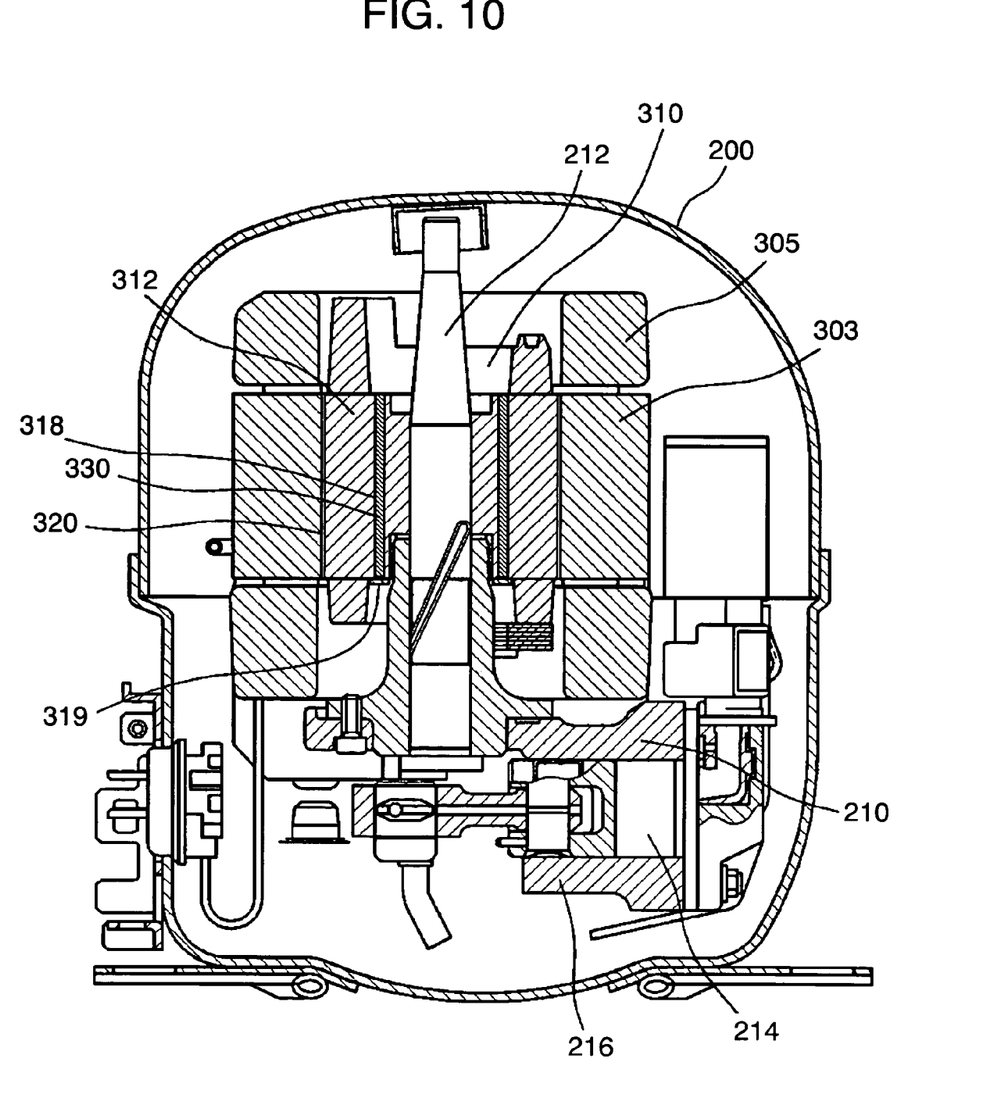
FIG. 10 is a vertical cross sectional view showing a compressor in accordance with a fourth exemplary embodiment of the present invention.

As shown in FIG. 10, sealed vessel 200 houses motor 305 having stator 303 and rotor 310, and compressing element 210 driven by motor 305.

Compressing element 210 includes revolving shaft 212, and cylinder 216 which supports shaft 212 and forms compression chamber 214.

Shaft 212 and rotor 310 are coupled and fixed together, and stator 303 is fixed on cylinder 216 so that it is coaxial to shaft 212 and there is certain specific gap 320 between stator 303 and rotor 310.

Rotor 310 is provided at iron core portion 312 with magnet slots 318 for holding the magnet, and magnet 330 is kept within magnet slot 318. Thus, an inverter-driven DC motor is structured. Provided fixed at the bottom end-face of iron core portion 312 is end-plate 319 for sealing the open bottom-end of magnet slot 318. The method of assembling the compressor remains the same as that in the second embodiment.

Now operation of the above configuration is described.

When electricity is delivered to stator 303 from an inverter circuit (not shown), rotor 310 rotates in engagement with shaft 212.

Compressing element 210 compresses the gas in compression chamber 214.

Since the compressor has been assembled in the same method as in the second embodiment, the assembling operation is easy and the efficiency is high. Furthermore, the stator is not requested to withstand a big current. Therefore, the compressors thus assembled exhibit a high reliability.

Furthermore, there is no need of immersing the stator coil in a varnish. This is a contribution to the reduction of manufacturing cost.

Still further, since magnets 330 kept at the certain specific place in magnet slots 318 are magnetically sticking (adhering) to silicon steel sheets forming the iron core portion, they are hardly displaced from their specific places unless they are affected by an extraordinary force. Therefore, there is no need to sealopen ends of magnet slot 118; at least a sealing at the insertion ends (open end at the top end-face) can be eliminated.

Still further, magnet 330 is pushed downward, via push member 182, for a certain specific distance with rod-shaped push-out pin 180 disposed in holes 106 so that they reach certain specific places in magnet slot 318 of iron core portion 312. Therefore, end-plate 319 described in the present embodiment can also be eliminated. As the result, an inexpensive compressor consisting of a reduced number of component is implemented.

As described above, the present embodiment offers at a low manufacturing cost compressors of high reliability assembled with fewer constituent components.

As explained in the foregoing descriptions, the present invention offers the following advantages.

The magnetizing jig in accordance with the present invention makes it easy to push the magnetized magnets out of jig. So, the efficiency of assembling operation is improved.

The magnetizing jig offers the same advantage even in a case when a rare earth magnet of strong magnetic force is used.

The magnetizing jig makes it easy to push out the magnetized magnets from the slots and transfer them into a rotor's slots. So, the efficiency of assembling operation is improved.

The method for assembling a rotor in accordance with the present invention magnetizes the magnets without delivering electricity to the stator coil. Thus the present invention offers a method of assembling the rotors needed to implement the reliable yet low cost compressors.

The method for assembling a rotor in accordance with the present invention makes it possible to deliver only those magnets which have been magnetized without fail for the assembly of rotors. Thus the present invention offers an assembling method, where the rotors are provided with only such magnets that have been surely magnetized.

The relative positioning between stator and rotor has been fixed keeping a certain specific gap among them. The certain specific gap can not be ill-affected by the influence of magnetic forces. Therefore, the assembling method provides compressor having a high reliability.

A compressor in the present invention uses a dipole permanent magnet type motor, which includes a secondary conductor provided at the circumference region of the rotor's iron core portion and the magnets built in the rotor iron core portion. The compressors employing the dipole permanent magnet type motor can be assembled easily with high reliability in accordance with the present invention.

Furthermore, compressors employing an inverter-driven DC motor can be assembled easily and with high reliability in accordance with the present invention.

Since the magnetized magnets stay within the magnet slots taking advantage of the self magnetic forces, a member for sealing the slots becomes unnecessary. So, the compressors having fewer component can be offered at a low manufacturing cost in accordance with the present invention.

A reliable and inexpensive dipole permanent magnet type motor consisting of fewer component and requiring fewer assembly steps can be provide in accordance with the present invention.

A compressor employing an inverter-driven DC motor consisting of fewer component counts and requiring fewer assembly steps can be provide, in accordance with the present invention.

INDUSTRIAL APPLICABILITY

The present invention offers such electric compressors having fewer component counts that can be assembled through easy assembly steps, yet provide a high reliability.

The invention claimed is:

1. A method of assembling a rotor, comprising:
providing a magnetizing jig for use in magnetizing magnets for insertion into magnet slots of an iron core portion of a motor rotor having a rotary axis, said magnetizing jig comprising
a magnetizing jig body having a center axis,
wherein said magnetizing jig body has magnet-receiving slots arranged for slidably receiving pre-magnetization magnets, respectively, to be magnetized while in said magnet-receiving slots,
wherein said magnet-receiving slots extend through said magnetizing jig body along an axial direction of said center axis,
wherein said magnet-receiving slots are formed in said magnetizing jig body so as to be spaced circumferentially about said center axis,
wherein said magnetizing jig body is configured to be fitted to an upper end-face of the rotor such that said center axis aligns with the rotary axis of the rotor and said magnet-receiving slots of said magnetizing jig body align respectively with the magnet slots of the iron core portion of the rotor,
wherein said magnetizing jig body is formed of a non-magnetic material such that the magnets, after having been magnetized in said magnet-receiving slots, do not stick to said magnetizing jig body, and
wherein said magnetizing jig body further has magnet push-out holes formed therein along said magnet-receiving slots for receipt of magnet push-out pins to push the magnets, after having been magnetized, out of said magnet-receiving slots into the magnet slots of the rotor;
inserting the pre-magnetization magnets into said magnet-receiving slots of said magnetizing jig body of said magnetizing jig;
providing a magnetizing coil wound about an outer circumference of said magnetizing jig body;
magnetizing the pre-magnetization magnets by supplying electricity to the magnetizing coil wound about the outer circumference of the magnetizing jig body to cause the magnets in said magnet-receiving slots of said magnetizing jig body to become magnetized magnets;

fitting said magnetizing jig body to the upper end-face of the rotor such that said center axis of the magnetizing jig body is aligned with the rotary axis of the rotor and said magnet-receiving slots of said magnetizing jig body align respectively with the magnet slots of the iron core portion of the rotor; and inserting magnet push-out pins into the magnet push-out holes and operating the magnet push-out pins to push the magnetized magnets out of said magnet-receiving slots into the magnet slots of the iron core portion of the rotor.

2. The method according to claim 1, further comprising providing a search coil and, after said magnetizing of the pre-magnetization magnets, measuring magnetic flux of the magnetized magnets with the search coil.

3. A method of assembling a rotor, comprising:

providing a magnetizing jig for use in magnetizing magnets for insertion into magnet slots of an iron core portion of a motor rotor having a rotary axis, said magnetizing jig comprising a magnetizing jig body having a center axis, wherein said magnetizing jig body has magnet-receiving slots arranged for slidably receiving pre-magnetization magnets, respectively, to be magnetized while in said magnet-receiving slots, wherein said magnet-receiving slots extend through said magnetizing jig body along an axial direction of said center axis, wherein said magnet-receiving slots are formed in said magnetizing jig body so as to be spaced circumferentially about said center axis, wherein said magnetizing jig body is configured to be fitted to an upper end-face of the rotor such that said center axis aligns with the rotary axis of the rotor and said magnet-receiving slots of said magnetizing jig body align respectively with the magnet slots of the iron core portion of the rotor, and wherein said magnetizing jig body is formed of a non-magnetic material such that the magnets, after having been magnetized in said magnet-receiving slots, do not stick to said magnetizing jig body;

inserting the pre-magnetization magnets into said magnet-receiving slots of said magnetizing jig body of said magnetizing jig;

providing a magnetizing coil wound about an outer circumference of said magnetizing jig body;

magnetizing the pre-magnetization magnets by supplying electricity to the magnetizing coil wound about the outer circumference of the magnetizing jig body to cause the magnets in said magnet-receiving slots of said magnetizing jig body to become magnetized magnets;

fitting said magnetizing jig body to the upper end-face of the rotor such that said center axis of the magnetizing jig body is aligned with the rotary axis of the rotor and said magnet-receiving slots of said magnetizing jig body align respectively with the magnet slots of the iron core portion of the rotor; and pushing the magnetized magnets out of said magnet-receiving slots of said magnetizing jig body and into the magnet slots of the iron core portion of the rotor.

4. The method according to claim 3, further comprising providing a search coil and, after said magnetizing of the pre-magnetization magnets, measuring magnetic flux of the magnetized magnets with the search coil.

5. A method of assembling a rotor, comprising:

providing a magnetizing jig for use in magnetizing magnets for insertion into magnet slots of an iron core portion of a rotor of a motor having a rotary shaft fixed for rotation with the rotor, said magnetizing jig comprising a magnetizing jig body having a shaft-receiving hole formed at a central portion thereof;

wherein said magnetizing jig body has magnet-receiving slots arranged for slidably receiving pre-magnetization magnets, respectively, to be magnetized while in said magnet-receiving slots, wherein said magnet-receiving slots extend through said magnetizing jig body along an axial direction of said shaft-receiving hole, wherein said magnet-receiving slots are formed in said magnetizing jig body so as to be spaced circumferentially about said shaft-receiving hole, wherein said magnetizing jig body is configured to be fitted to an upper end-face of the rotor such that said shaft-receiving hole receives the rotary shaft of the motor and said magnet-receiving slots of said magnetizing jig body align respectively with the magnet slots of the iron core portion of the rotor, wherein said magnetizing jig body is formed of a non-magnetic material such that the magnets, after having been magnetized in said magnet-receiving slots, do not stick to said magnetizing jig body, and wherein said magnetizing jig body further has magnet push-out holes formed therein along said magnet-receiving slots for receipt of magnet push-out pins to push the magnets, after having been magnetized, out of said magnet-receiving holes into the magnet holes of the rotor;

inserting the pre-magnetization magnets into said magnet-receiving slots of said magnetizing jig body of said magnetizing jig;

providing a magnetizing coil wound about an outer circumference of said magnetizing jig body;

magnetizing the pre-magnetization magnets by supplying electricity to the magnetizing coil wound about the outer circumference of the magnetizing jig body to cause the magnets in said magnet-receiving slots of said magnetizing jig body to become magnetized magnets;

fitting said magnetizing jig body to the upper end-face of the rotor such that said shaft-receiving hole of the magnetizing jig body receives the rotary shaft of the motor and said magnet-receiving slots of said magnetizing jig body align respectively with the magnet slots of the iron core portion of the rotor; and inserting magnet push-out pins into the magnet push-out holes and operating the magnet push-out pins to push the magnetized magnets out of said magnet-receiving slots into the magnet slots of the iron core portion of the rotor.

6. The method according to claim 5, further comprising providing a search coil and, after said magnetizing of the pre-magnetization magnets, measuring magnetic flux of the magnetized magnets with the search coil.

7. A method of assembling a rotor, comprising:

providing a magnetizing jig for use in magnetizing magnets for insertion into magnet slots of an iron core portion of a rotor of a motor having a rotary shaft fixed for rotation with the rotor, said magnetizing jig comprising a magnetizing jig body having a shaft-receiving hole formed at a central portion thereof;

wherein said magnetizing jig body has magnet-receiving slots arranged for slidably receiving pre-magnetization magnets, respectively, to be magnetized while in said magnet-receiving slots, wherein said magnet-receiving slots extend through said magnetizing jig body along an axial direction of said shaft-receiving hole, wherein said magnet-receiving slots are formed in said magnetizing jig body so as to be spaced circumferentially about said shaft-receiving hole, wherein said magnetizing jig body is configured to be fitted to an upper end-face of the rotor such that said shaft-receiving hole receives the rotary shaft of the motor and said magnet-receiving slots of said magnetizing jig body align respectively with the magnet slots of the iron core portion of the rotor, and wherein said magnetizing jig body is formed of a non-magnetic material such that the magnets, after having been magnetized in said magnet-receiving slots, do not stick to said magnetizing jig body;

inserting the pre-magnetization magnets into said magnet-receiving slots of said magnetizing jig body of said magnetizing jig;

providing a magnetizing coil wound about an outer circumference of said magnetizing jig body;

magnetizing the pre-magnetization magnets by supplying electricity to the magnetizing coil wound about the outer circumference of the magnetizing jig body to cause the magnets in said magnet-receiving slots of said magnetizing jig body to become magnetized magnets;

fitting said magnetizing jig body to the upper end-face of the rotor such that said shaft-receiving hole of the magnetizing jig body receives the rotary shaft of the motor and said magnet-receiving slots of said magnetizing jig body align respectively with the magnet slots of the iron core portion of the rotor; and pushing the magnetized magnets out of said magnet-receiving slots of said magnetizing jig body and into the magnet slots of the iron core portion of the rotor.

8. The method according to claim 7, further comprising providing a search coil and, after said magnetizing of the pre-magnetization magnets, measuring magnetic flux of the magnetized magnets with the search coil.

9. A method of assembling an electric compressor including a rotary shaft and a motor, wherein the motor has a stator and a rotor rotatable relative to the stator and together with the rotary shaft, said method comprising:

providing a magnetizing jig for use in magnetizing magnets for insertion into magnet slots of an iron core portion of a rotor of a motor having a rotary shaft fixed for rotation with the rotor, said magnetizing jig comprising a magnetizing jig body having a shaft-receiving hole formed at a central portion thereof;

wherein said magnetizing jig body has magnet-receiving slots arranged for slidably receiving pre-magnetization magnets, respectively, to be magnetized while in said magnet-receiving slots, wherein said magnet-receiving slots extend through said magnetizing jig body along an axial direction of said shaft-receiving hole, wherein said magnet-receiving slots are formed in said magnetizing jig body so as to be spaced circumferentially about said shaft-receiving hole, wherein said magnetizing jig body is configured to be fitted to an upper end-face of the rotor such that said shaft-receiving hole receives the rotary shaft of the motor and said magnet-receiving slots of said magnetizing jig body align respectively with the magnet slots of the iron core portion of the rotor, and wherein said magnetizing jig body is formed of a non-magnetic material such that the magnets, after having been magnetized in said magnet-receiving slots, do not stick to said magnetizing jig body;

providing a cylinder which supports the rotary shaft and defines a compression chamber and which, together with the rotary shaft constitutes a compressing element;

fixing the rotary shaft and the rotor together;

fixing the stator to the cylinder so that the stator is coaxial to the rotor and a certain gap is provided between the stator and the rotor;

inserting the pre-magnetization magnets into said magnet-receiving slots of said magnetizing jig body of said magnetizing jig;

providing a magnetizing coil wound about an outer circumference of said magnetizing jig body;

magnetizing the pre-magnetization magnets by supplying electricity to the magnetizing coil wound about the outer circumference of the magnetizing jig body to cause the magnets in said magnet-receiving slots of said magnetizing jig body to become magnetized magnets;

fitting said magnetizing jig body to the upper end-face of the rotor such that said shaft-receiving hole of the magnetizing jig body receives the rotary shaft of the motor and said magnet-receiving slots of said magnetizing jig body align respectively with the magnet slots of the iron core portion of the rotor;

pushing the magnetized magnets out of said magnet-receiving slots of said magnetizing jig body and into the magnet slots of the iron core portion of the rotor; and housing the motor and the compressing element in a sealed vessel.

10. The method according to claim 9, further comprising providing a search coil and, after said magnetizing of the pre-magnetization magnets, measuring magnetic flux of the magnetized magnets with the search coil.

\* \* \* \* \*